Aug. 15, 1961   W. A. HUNSUCKER   2,995,900
PORTABLE MARINE STRUCTURE
Filed Oct. 25, 1954   3 Sheets-Sheet 1
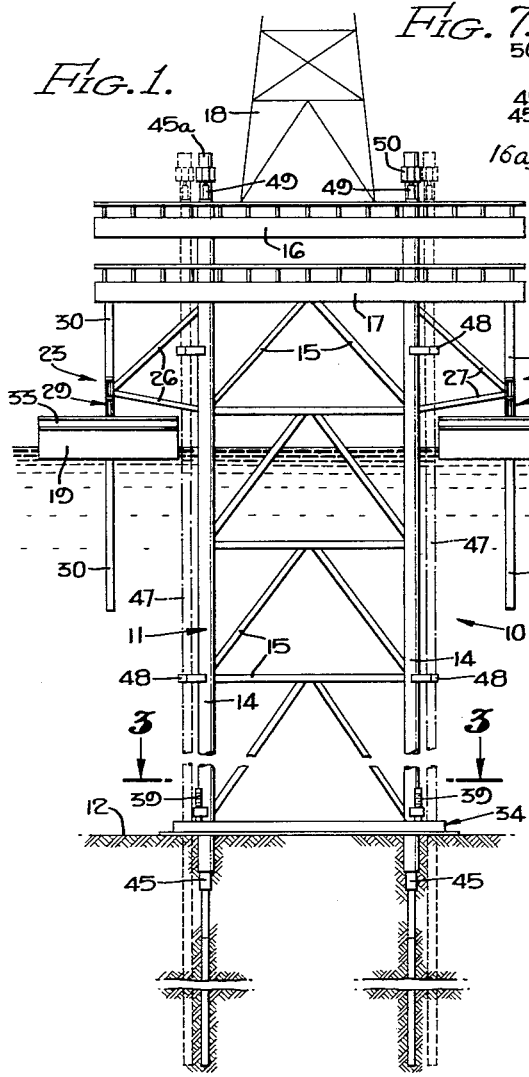
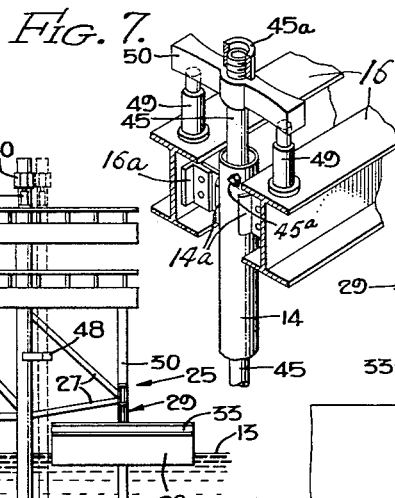
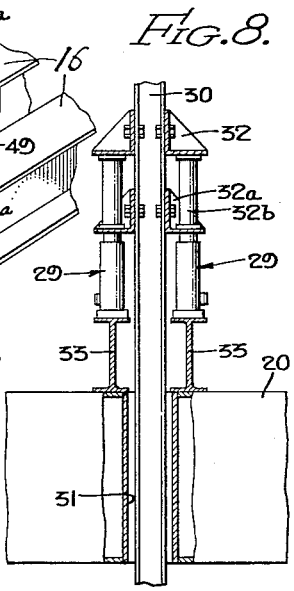
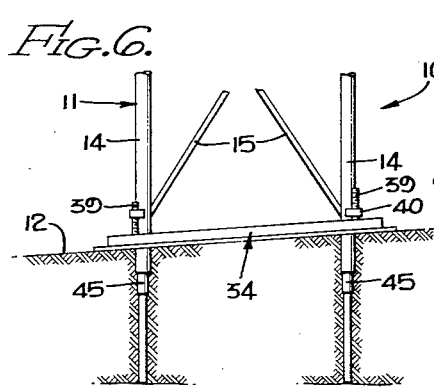
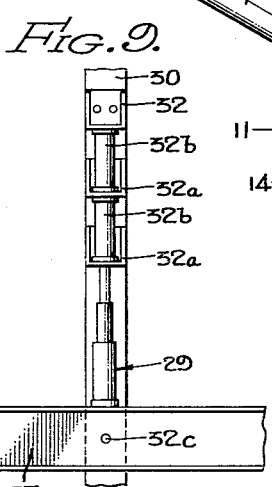
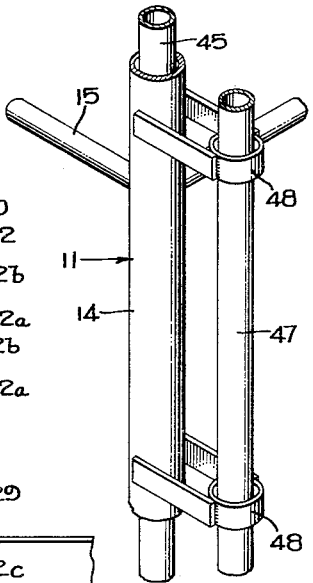
WILLIAM A. HUNSUCKER,
INVENTOR.
BY Lyon & Lyon
ATTORNEYS Aug. 15, 1961 W. A. HUNSUCKER 2,995,900
PORTABLE MARINE STRUCTURE
Filed Oct. 25, 1954 3 Sheets-Sheet 2

WILLIAM A. HUNSUCKER,
INVENTOR.

BY Lyon & Lyon
ATTORNEYS

Aug. 15, 1961 W. A. HUNSUCKER 2,995,900
PORTABLE MARINE STRUCTURE
Filed Oct. 25, 1954 3 Sheets-Sheet 3

INVENTOR.
WILLIAM A. HUNSUCKER
BY
*Lyon & Lyon*
ATTORNEYS

United States Patent Office 2,995,900
Patented Aug. 15, 1961

2,995,900
PORTABLE MARINE STRUCTURE
William A. Hunsucker, 3741 Prestwich Drive,
Los Angeles 27, Calif.
Filed Oct. 25, 1954, Ser. No. 464,255
1 Claim. (Cl. 61—46.5)

This invention relates to marine support structures and apparatus for installing, removing and transporting such structures in off-shore locations.

The invention has particular utility when applied to a structure for installation in the sea in coastal regions to support a derrick and other equipment for off-shore drilling of oil wells, and will be considered in this connection hereinafter for purposes of illustration; however, the invention is not limited in application to a structure for installation in the sea, but may also be applied to structures for installation in fresh water and for usages other than the drilling of oil wells.

Present marine structures of this type are very massive and require extensive marine construction operations at the site in order to install or remove them. In addition, most of such structures must be partially or completely dismantled in order to remove them from a site and the drilling equipment installed thereon must be removed from the operating decks in order to permit the removal of the structure.

An object of the invention, therefore, is to provide separate buoyant means to support and transport the structure to facilitate its installation or its removal and reinstallation.

A more particular object of the invention is to provide a means for supporting the structure on separate buoyant means at a limited number of support points in such a manner as not to induce undue stress in the structure because of the effect of vertical forces due to wind and wave action on the separate buoyant means.

A further object of the invention is to provide means whereby two barges can be placed, one on each side of the structure, and spaced apart horizontally and yet respond independently of each other to the vertical forces induced on the barges by wind and wave action.

Another object is to provide means whereby the deck or decks can be raised or lowered relative to the remainder of the structure and to adjust the structure to a greater or smaller height so as to conform to deeper or shallower water when the structure is moved from one site to another site.

Another object is to provide means whereby at least part of the weight of the structure and the load superimposed thereon can be transferred to the sea bed by means of a base member located substantially at the level of the sea bed.

Another object is to provide means whereby the central axis of the structure can be adjusted to a vertical alignment while the base member of the structure is in a non-level position so as to conform to a non-level sea bed.

Another object is to provide means whereby the central axis of the structure can be adjusted to a vertical alignment when the structure is removed from a site with one slope of the sea bed to another site with a different slope of the sea bed, said adjusting means to be operable either from above or below the water surface.

A further object is to provide a means for supporting and stabilizing the structure in substantially a vertical position by means of a separate buoyant means and auxiliary members to prevent the structure from tipping during its transport from one site to another site.

Another object is to provide means whereby the structure can be removed from one site and reinstalled at another site without the necessity of dismantling the structure or removing the equipment installed thereon.

Another object is to provide means whereby at least part of the loads supported by the structure are transmitted to the sea bed by means of a base member located substantially at the level of the sea bed and driven piles or cast-in-place concrete piers assist in preventing the structure from tipping or moving laterally due to wind or wave action.

Another object is to provide means whereby the foundation members of the structure can be preloaded to test their ability to sustain the loads to be supported by the structure.

An additional object is to provide means to force the base member of the structure into intimate contact with the sea bed so that the lateral forces applied to the structure can be resisted by friction between the base member and the sea bed.

Another object is to use the minimum number of members in the structure and to reduce the total area of members exposed to forces caused by wind and wave action by providing guides supported by outrigger members attached to the main portion of the structure at vertical intervals and installing additional load supporting members through these guides in cases where additional load supporting members are required.

Briefly stated it is a feature of my invention to provide a framework which rests on bottom and which supports a load-carrying platform above the water level. Floating barges are positioned on opposite sides of the framework and are provided with means such as power-operated jacks for raising and lowering the structure. The manner of supporting the structure on the barges provides both longitudinal and lateral stability so that after raising the structure off bottom it may be transported on the barges to a new drilling site without danger of overturning.

Other and more detailed objects and advantages will appear hereinafter:

In the drawings:

FIGURE 1 is a side elevation showing a preferred embodiment of my invention illustrated in diagrammatic form.

FIGURE 6 is a side elevation showing the relative position of the footpiece or base member and the columns of the structure, when the base member rests on an inclined floor of the body of water.

FIGURE 7 is a fragmentary perspective view showing the manner of applying a downward force to the load supporting structure.

FIGURE 8 is a side elevation partly in section showing the operation of the lifting jacks mounted on the barges.

FIGURE 9 is a side elevation of the apparatus shown in FIGURE 8.

FIGURE 11 is a fragmentary elevation showing a modified form of my invention.

Figure 2:
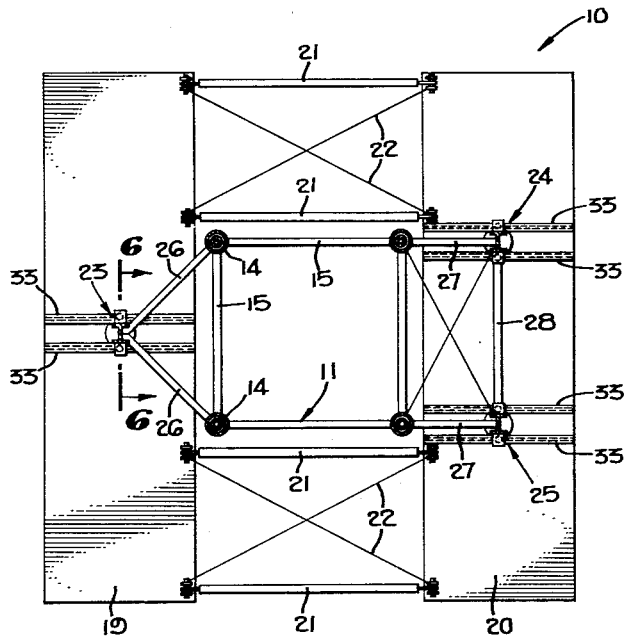
FIGURE 2 is a plan view thereof.

Referring to the drawings:

The marine support structure, generally designated 10, includes a framework 11 which extends from the sea bed 12 to a position above the water level 13. This framework 11 is preferably formed of a plurality of tubular columns 14 which are disposed in locations outlining a geometrical figure with a closed perimeter. Cross braces 15 connect the columns and provide stability.

One or more load-carrying platforms 16 and 17 are releasably secured to the columns 14 at a position above the water level 13. A derrick 18 of the type used in the drilling of wells is mounted on the platform 16. A drilling rig of conventional form, not shown, is also mounted on the platform 16.

The platforms 16 and 17 are bolted or otherwise fixed to the upper ends of the columns 14 when it is desired to move the structure from one site and relocate it in another site. The platforms may be raised or lowered relative to the columns as required. In the event that it is desired to relocate the structure in deeper water additional sections of the columns 14 may be welded on to extend the length thereof. Means, such as hydraulic jacks, not shown, may be employed for raising or lowering the platforms 16 and 17 with respect to the columns.

Means are provided for raising and lowering the structure 10 and for transporting it from one drilling site to another. As shown in the drawings, this means includes the two floating barges 19 and 20 positioned on opposite sides of the framework 11. These barges 19 and 20 may be held in spaced position by means of the pipe column struts 21 which are pin-connected at their ends to the barges. By this construction, the barges 19 and 20 are permitted to have independent vertical movement on the water without substantially varying their horizontal spaced relationship. Cables 22 serve as cross bracing to prevent one barge from moving ahead of the other. The pipe column struts 21 and cross brace cables 22 are omitted from FIGURE 1 for clarity of illustration.

The separate buoyant means may alternately be spaced apart by the rigidity of the marine structure itself and the pipe struts 21 and the cross bracing 22 be dispensed with without departing from the spirit of the invention.

I prefer to support the marine structure 10 from the floating barges 19 and 20 at three spaced support points. As shown in the drawings, one of these support points is defined by the lift element 23 and the other two support points are defined by lift elements 24 and 25. The lift element 23 is positioned above a center point on the barge 19 and the lift elements 24 and 25 are located over the barge 20 and spaced axially along the center line thereof. The lift element 23 is connected to the framework 11 by means of the temporary members 26 and the lift elements 24 and 25 are similarly connected to the framework 11 by means of the temporary members 27. A spacer bar 28 connects the lift elements 24 and 25 together.

Power operated jacks 29 of the type shown diagrammatically in FIGURE 8 are mounted on the barges 19 and 20 directly below the lift elements 23, 24, and 25. A post 30 is fixed to each of the lift elements and extends downward through an open well 31 provided in the barge. Brackets 32 are bolted or otherwise fixed to the sides of each post 30. The jacks 29 may operate directly against the brackets 32, or against similar brackets 32a and spacer elements 32b inserted therebetween. Pins 32c may be inserted into aligned apertures in the post 30 and beams 33 to hold the post at any given height while the jacks are being retracted for another stroke.

The post 30 may optionally be extended upwardly so as to engage the deck framing members which may be extended so as to permit said engagement. The lifting effort applied to the post 30 may be transmitted to the deck members and thus the structure may be raised above the sea bed preparatory to its removal.

The three point suspension just described for supporting the marine structure 10 on the floating barges 19 and 20 provides stability against overturning while enabling the structure to be raised and lowered relative to the sea bed 12. It is recognized, however, that it would be possible to support the structure with only one support point on each barge particularly for deep water locations without departing from the spirit of my invention.

Figure 5:
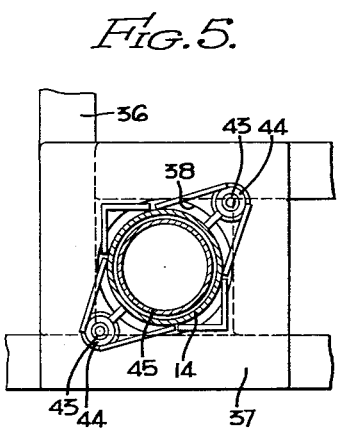
FIGURE 5 is a top view of the apparatus shown in FIGURE 4.
Figure 3:
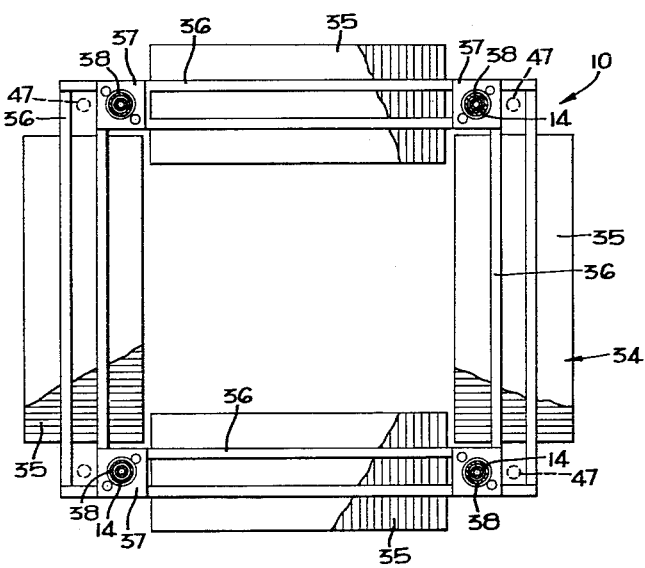
FIGURE 3 is a sectional plan view taken substantially on the lines 3—3 as shown in FIGURE 1.
Figure 4:
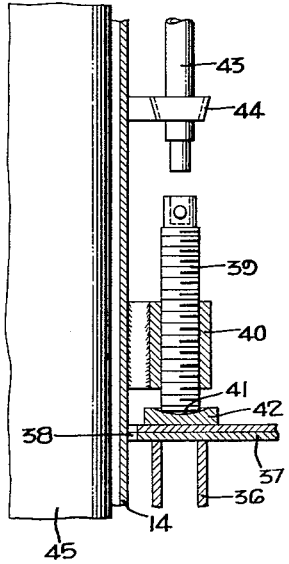
FIGURE 4 is a sectional elevation showing details of the leveling screws for adjusting the position of the footpiece with respect to the columns of the framework.
Figure 10:
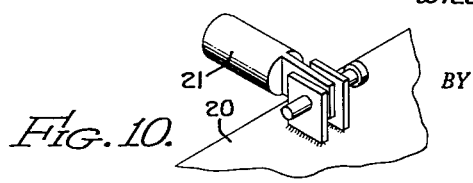
FIGURE 10 is a fragmentary detail showing the pin connection at the end of one of the barge spacing beams.
Figure 12:
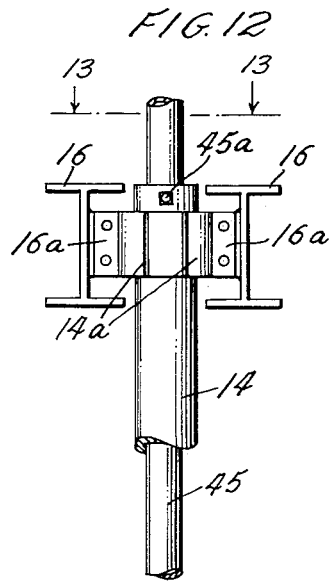
FIGURE 12 is an enlarged fragmentary vertical end view illustrating the connection between the marine structure and the load support members.
Figure 13:
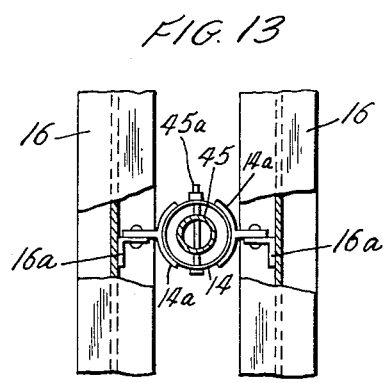
FIGURE 13 is a horizontal plan view partly in section taken on the line 13—13 of FIGURE 12 with certain portions being broken away.
Figure 14:
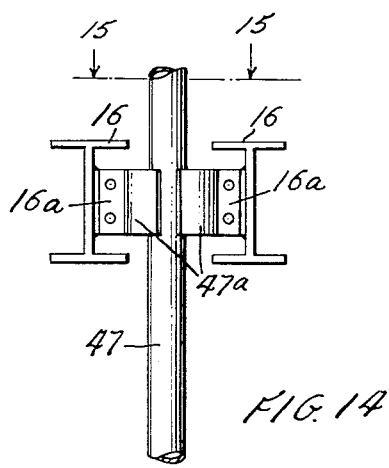
FIGURE 14 is an enlarged fragmentary vertical end view, similar to FIGURE 12, illustrating the connection between the marine structure and additional load supporting members.
Figure 15:
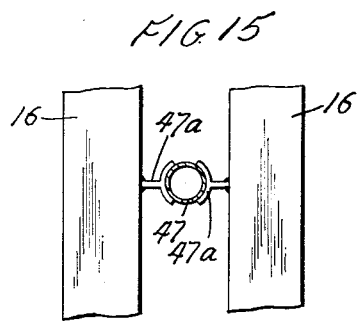
FIGURE 15 is a horizontal plan view taken on the line 15—15 of FIGURE 14.

The structure 10 employs a base member or footpiece 34 which rests directly on the sea bed 12. This member 34 is best shown in FIGURE 3 and includes a plurality of load distributing pads 35 connected by structural members 36, corner plates 37 and provided with apertures 38 which loosely receive the vertical columns 14 so that the base member 34 may be inclined in any direction with respect to the vertical axis of the framework 11. FIGURE 6 shows the base member 34 resting on an inclined sea bed 12. Means are provided for transferring the load from the base member 34 to the columns 14. As shown in FIGURES 4 and 5 this means may include jack screws 39 operating through stationary nuts 40 fixed to the columns 14. A spherical joint 41 is provided between the jack screws 39 and the pads 42 which engage the base member 34, to permit the base member 34 to be adjusted to an inclined position when required. A rotary tool 43 may extend through a stationary pilot 44 for engagement with the upper end of each jack screw 39. The tool 43 may extend to the surface or may be operated by divers below the water level. The base member 34 is loosely attached to the framework 11 by means such as long bolts, not shown, equipped with large washers and nuts so that said washers are engaged after the framework is raised a predetermined distance. Thus the base member can be raised off of the sea bed along with the framework 11 and yet remain in position to receive the framework 11 when the structure 10 is set down on the desired site.

In areas where the sea bed is generally level the above adjustment feature to adjust to a non-level sea bed may optionally be omitted and the base member 34 may be rigidly attached to the framework 11.

In order to loosen the base member 34 from the sea bed 12 preparatory to the removal of the structure 10, water jet nozzles, not shown, may be installed at the lower surface of the base member 34. These nozzles would be connected to suitable pipes which would extend to the decks 16 and 17.

The support may be attached to the earth and made ready to support the loads to be applied thereon as follows: After the structure is set in place on either an initial or a subsequent site with the base member in contact with the sea bed, load supporting members 45 are installed inside the tubular columns 14 of the framework 11. These load supporting members 45 inside the tubular columns 14 penetrate into the sea bed 12 below the base member 34 and may be cast-in-place concrete piers as disclosed in my copending application, Serial No. 263,085, now abandoned, or these members may comprise driven piles of any cross section or materials. It is preferred, however, that the upper extension of each load supporting member 45 be tubular in cross section from a point below the sea bed to the upper deck so that it may be readily cut in a zone below the sea bed by means inserted interior thereof and actuated from the deck so as to readily detach the structure for easy removal.

The structure is preferably fabricated and assembled at a convenient location on shore. After its assembly it may be transported to the selected site by any means suitable to transport the structure. Upon arrival at the selected site the structure is lowered to rest on the sea bed.

If it is considered necessary to excavate shafts and install cast-in-place concrete piers a light-weight drilling rig is then installed (not shown) on the deck or platform of the structure and used to drill shafts on the prolongation of the corner tubular members.

The shafts may be extended to the desired depth, say 100′ to 300′, depending on the nature of the formations and the magnitude of the loads to be sustained. Cementitious material is then placed in the shafts to form load supporting elements. The cementitious material extends up into the lower portion of the upper extension of the load supporting member 45 but preferably does not extend at this time above the elevation of the sea bottom.

After these load supporting members 45 are installed firmly in the sea bed and before they are attached to the corner tubular members of the framework near the top of said corner tubular members, the structure may be tested for its ability to support loads by means such as described below.

Pairs of hydraulic jacks 49 may be installed on the framework of the upper deck which is attached to the tubular columns 14 of the framework 11 and positioned adjacent to the tubular column. A cross head 50 may be placed over each pair of jacks and the cross head may be interconnected to said load supporting members 45 by means of the collars 45a. The cross head 50 may then be forced upward by means of the hydraulic jacks and the intensity of this upward acting force may be indicated by means of suitable pressure gauges (not shown) on the hydraulic jacks. The upward acting force on the cross head is imparted to the load supporting member 45 inside the tubular column 14 of the framework 11. At this time the tubular columns 14 of the framework must support the dead weight of the structure and the equipment thereon as well as an additional downward acting force equal in amount to the upward acting force applied to the load supporting members 45 inside said tubular columns 14.

The total forces supported by the tubular columns 14 are transmitted to the base member 34 which in turn transmits them to the sea bed 12. The base member 34 is thus forced into close and intimate contact with the sea bed 12 and may be at least partially embedded therein. Friction between the base member 34 and the sea bed 12 will thus be very large and can be relied upon, at least in part, to resist any tendency of the structure to slide because of lateral or horizontal forces induced by wind or wave action.

Lugs (not shown) may be attached to the lower face of the base member 34 so as to increase this resistance to sliding because of horizontal forces, The upward acting forces applied to the load supporting member 45 as measured by the gauges on the jacks is a close approximation of the downward acting forces these members will support. This is true because the load supporting capacity of a driven pile or a cast-in-place concrete pier is determined primarily by skin friction which is approximately the same whether the forces acting thereon are upward or downward.

If the sum of the forces applied to the load supporting members 45 plus an equal amount applied to the tubular columns 14 is adequate to meet the total loads expected to be applied to the structure as determined by a suitable engineering design, the load supporting members 45 may be attached to the tubular column 14 and the structure is ready for usage. If the loads as measured above are not considered adequate, additional load supporting members 47 similar to members 45 may be installed in the sea bed through the outrigger members 48. These additional members 47 may in turn be tested by means such as the hydraulic jacks as described above, and during such testing they act as tension members. These additional members 47 may be vertical, or inclined if desired in order to assist in resisting lateral loads.

The outrigger members 48 referred to above are attached to the main framework of the structure at vertical intervals and are provided with guide portions through which the additional load support members 47 are passed. The guide portions also provide lateral support for the part of the additional load support members 47 above the sea bed. It is not necessary that the guides be continuous. The use of the above outrigger members and guides results in a reduction in the number of web bracing members required which further reduces the amount of lateral loads imposed on the structure because of wind and wave action.

The load supporting members 45 and 47 may optionally be attached to the tubular columns 14 or the deck framing members by means such as bolting except during the testing period while they are under tension or uplift stress imposed by the hydraulic jacks 49 and cross heads 50.

The combination of the base member 34, the load supporting members 45 and the additional members 47 provides a maximum supporting capacity although there is a minimum number of members required in the structure and there is a minimum surface area exposed to wind and wave action.

In use the marine support structure 10 is floated to the desired drilling site by means of the barges 19 and 20 and is then lowered to rest on bottom. The base plate 34 is adjusted to conform to the inclination of the sea bed 12 and the jack screws 39 are manipulated to transfer the weight of the structure 10 to the base member 34. A well is drilled by means of conventional machinery mounted on one or more of the platforms 16 and 17. After completion of the well the marine support structure 10 may be removed and transported to a new drilling site. This is accomplished by severing the connections between the structure 10 and the sea bed and by raising the entire structure 10 by means of the jacks 29 carried on the barges 19 and 20.

The structure can be detached from the sea bed by the method described in my copending application, Serial No. 263,085, in the event the structure is attached to the earth by means of concrete piers cast-in-place in drilled holes, or, in the event the structure is attached to the earth by means of driven piles, by the removal of the piles or cutting the piles so as to release the structure. The proposed method is equally applicable in case either of the above methods of attachment is used or to any other method whereby the structure can be detached from the sea bed.

It is unnecessary to dismantle the drilling rig during operations of removing and relocating the support structure at the new drilling site. When the new site is reached the structure 10 is lowered by means of the jacks 29, the base member 34 is adjusted to conform to the inclination of the sea bed at the new location and the structure 10 is again attached to the sea bed and made ready to support the loads to be applied thereon.

Having fully described my invention, it is to be understood that I do not wish to be limited to the details herein set forth, but my invention is of the full scope of the appended claim.

I claim:

A marine structure adapted to be supported by the bottom of a body of water, said marine structure including: a multicornered skeletonic framework providing a plurality of tubular column members spaced apart by bracing members, a load carrying platform on the framework positioned above the water level, load support members inside said tubular columns extending into the earth below the body of water, vertically spaced guides projecting outwardly from and attached to the said columns outside said framework, auxiliary load support members mounted for longitudinal movement in said guides and extending into the earth below the body of water, and means connecting said load support members and said auxiliary load support members to said structure to carry vertical loads.

References Cited in the file of this patent

UNITED STATES PATENTS

| | | |
|---|---|---|
| 1,868,494 | Collins | July 26, 1932 |
| 2,210,408 | Henry | Aug. 6, 1940 |
| 2,318,685 | Gross | May 11, 1943 |
| 2,598,088 | Wilson | May 27, 1952 |
| 2,603,068 | Wilson | July 15, 1952 |
| 2,608,829 | Knapp | Sept. 2, 1952 |
| 2,612,024 | Hunsucker | Sept. 30, 1952 |
| 2,675,681 | Dawson | Apr. 20, 1954 |
| 2,771,747 | Rechtin | Nov. 27, 1956 |